United States Patent
Schmidt et al.

(10) Patent No.: US 6,548,133 B2
(45) Date of Patent: *Apr. 15, 2003

(54) MULTILAYER CONTAINER RESISTANT TO ELEVATED TEMPERATURES AND PRESSURES, AND METHOD OF MAKING THE SAME

(75) Inventors: Steven L. Schmidt, Bedford, NH (US); Suppayan M. Krishnakumar, Nashua, NH (US); Wayne N. Collette, Merrimack, NH (US)

(73) Assignee: Continental PET Technologies, Inc., Florence, KY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/072,886

(22) Filed: May 5, 1998

(65) Prior Publication Data

US 2002/0061371 A1 May 23, 2002

Related U.S. Application Data

(62) Division of application No. 08/610,810, filed on Mar. 7, 1996, now Pat. No. 5,804,016.

(51) Int. Cl.[7] .......................... B29C 49/06; B29D 23/00

(52) U.S. Cl. ............... 428/35.7; 428/36.91; 428/524.8; 264/513; 215/374; 215/375; 215/12.2

(58) Field of Search .................. 428/35.7, 36.6, 428/36.7, 36.9, 36.91, 480, 903.3, 542.8; 264/513; 215/374, 375, 377, 12.2

(56) References Cited

U.S. PATENT DOCUMENTS

| | | | |
|---|---|---|---|
| 4,496,064 A | 1/1985 | Beck et al. ................. 215/1 C |
| 4,609,516 A | 9/1986 | Krishnakumar et al. ..... 264/255 |
| 5,040,963 A | 8/1991 | Beck et al. ................. 425/130 |
| 5,221,507 A | 6/1993 | Beck et al. ................. 264/255 |
| 5,582,788 A | * 12/1996 | Collette et al. .......... 264/297.2 |
| 5,595,799 A | 1/1997 | Beck et al. ................. 428/35.7 |
| 5,628,957 A | 5/1997 | Collette et al. ............. 264/512 |
| 5,804,305 A | * 9/1998 | Slat et al. .................. 428/36.7 |
| 6,090,337 A | * 7/2000 | Slat ........................ 156/244.13 |
| 6,319,574 B1 | * 11/2001 | Slat ........................ 156/244.13 |

FOREIGN PATENT DOCUMENTS

| | | |
|---|---|---|
| EP | 0354255 A1 | 2/1990 |
| EP | 0371487 A2 | 6/1990 |
| GB | 2091629 A | 8/1982 |

* cited by examiner

*Primary Examiner*—Rena Dye
(74) *Attorney, Agent, or Firm*—Finnegan, Henderson, Farabow, Garrett & Dunner, L.L.P.

(57) ABSTRACT

A multilayer plastic container having enhanced strength for high temperature and pressure applications such as the pasteurization of carbonated juice drinks. The container is commercially cost-effective in comparison to prior art pasteurizable glass containers, and provides all of the advantages of plastic over glass, i.e., lightweight, shatter-resistant, etc. In a particular embodiment, the multilayer container includes inner and outer layers of a relatively high IV virgin PET, e.g., 0.85–0.90 dl/g, and a core layer of post-consumer PET having a substantially lower IV. The container has a relatively tall and slender profile, with high orientation levels in the panel and shoulder, and an oriented thick-walled base with feet. The base preferably has a high profile and angled foot pads which are allowed to move outwardly under creep. According to a method of making a multilayer preform for such container, an enhanced injection rate and mold pressure are utilized to enhance interlayer bonding and prevent separation of the layers in spite of their substantial differences in IV.

34 Claims, 12 Drawing Sheets

— 0.74 I.V. ◆ 0.80 I.V. ▲ 1.00 I.V.

MULTILAYER CONTAINER RESISTANT TO ELEVATED TEMPERATURES AND PRESSURES, AND METHOD OF MAKING THE SAME

This application is a divisional of application Ser. No. 08/610,810, filed Mar. 7, 1996, U.S. Pat. No. 5,804,016, entitled MULTILAYER CONTAINER RESISTANT TO ELEVATED TEMPERATURES AND PRESSURES, AND METHOD OF MAKING THE SAME, now PENDING.

FIELD OF THE INVENTION

The present invention relates to multilayer plastic containers for pressurized products which may be exposed to elevated temperatures and pressures, e.g., during pasteurization, and wherein the multiple layers are resistant to layer separation.

BACKGROUND OF THE INVENTION

Juice drinks are normally filled by one of three basic sterilization processes:

hot fill pasteurization aseptic fill.

Hot filling is not suitable for carbonated juice drinks due to the inability to maintain carbon dioxide ($CO_2$) in solution at elevated temperatures. Aseptic filling of carbonated drinks is possible, but has certain disadvantages which include requiring high levels of capital investment, operating maintenance, and expertise. As a result, pasteurization is the preferred sterilization approach for carbonated juice drinks.

Prior art pasteurizable beverage containers are typically made of glass, because glass can withstand the extended high temperatures and high internal pressures of the pasteurization cycle. FIG. 1 illustrates graphically, as a function of time, the increasing internal temperature and pressure during a pasteurization cycle of a 16-ounce glass container, which has been filled with a juice product carbonated at 2.5 volumes; "2.5 volumes" means that the volume of carbon dioxide at 0° C. under 1 atmosphere is 2.5 times the volume of the liquid. The typical pasteurization cycle, as shown in FIG. 1, includes five steps:

(1) immersion in bath 1, having a bath temperature of about 43° C., for about 12.5 minutes in order to raise the container and contents up to about the bath-1 temperature;

(2) immersion in bath 2, having a bath temperature of about 77° C., for the time from 12.5 to 21 minutes in order to raise the container and contents up to about the bath-2 temperature;

(3) immersion in bath 3, having a bath temperature of about 73° C., for the time from 21 to 31.5 minutes in order to hold the container and contents at about the bath-3 temperature;

(4) immersion in bath 4, having a bath temperature of about 40° C., for the time from 31.5 to 43 minutes in order to lower the container and contents down to about the bath-4 temperature; and (5) immersion in quench bath 5 for the time from 43 to 60 minutes in order to cool the container and contents down to about 10° C.

The temperature curve 12 shows that the container and contents remain above 70° C. for roughly 10 minutes (in bath 3), during which time the internal pressure curve 14 increases significantly to about 140 psi ($1 \times 10^6$ N·m$^{-2}$). This 10-minute hold period at a temperature of about 70 to 75° C. provides effective sterilization for most carbonated beverage products, including those containing 100% fruit juice. A glass container can withstand these temperatures and pressures without deformation.

In contrast, a conventional polyester carbonated soft drink (CSD) container made of polyethylene terephthalate (PET), and filled with a carbonated product, would undergo significant volume expansion (creep) when exposed to the elevated temperatures and pressures of the pasteurization process. An exemplary curve 16 of modulus versus temperature for biaxially-oriented PET is shown in FIG. 2. The modulus (an indicator of strength under pressure) decreases with increasing temperature; thus creep increases with increasing temperature. This data shows the tensile properties of a sample taken from a cylindrical panel section of a disposable CSD container made of PET (0.80 IV resin). The panel section was oriented at a planar stretch ratio of about 13:1; the testing was conducted on an Instron machine according to ASTM D638. For this prior art CSD container, the drop in strength at elevated temperatures would result in excessive volume expansion and physical distortion under normal pasteurization conditions, resulting in an unacceptable drop in the fill point and/or base roll out (instability).

PET (homopolymer or copolymer) resin used for disposable CSD containers has a glass transition temperature ($T_g$) on the order of 65–70° C. It is known that increasing the molecular weight (i.e., chain length of PET molecules) of the resin, which effectively increases $T_g$, can significantly strengthen the resulting biaxially-oriented container so as to resist or diminish creep at elevated temperatures. Intrinsic viscosity (IV) is used in the PET container industry as a standard measure of PET chain length. Known disposable CSD containers (freestanding, monolayer PET containers) have been produced from resins with IVs in the range of 0.70 to 0.85 dl/g. Increasing the IV beyond 0.85, and preferably beyond 0.90, has produced a freestanding monolayer PET container that can be successfully pasteurized at 70–75° C. for products carbonated at up to four volumes.

Although a higher molecular weight (higher IV) PET can provide enhanced strength at elevated temperatures, use of such high IV PET is difficult to justify economically because of its cost premium. For example, 0.90 or higher IV PET resins cost 20–30% more per unit weight, than 0.80 IV PET.

FIG. 3 is a graph of modulus versus temperature, similar to FIG. 2, but with three curves 20, 22, 24 to illustrate the influence of IV on the modulus/temperature relationship. Biaxially-oriented PET samples were taken from the panel sections of containers oriented at a planar stretch ratio of 12.0–12.5 for three different resin IVs, namely, 0.74, 0.80, and 1.00. These curves show that for example, at a modulus of $3 \times E^6$ psi ($20,690 \times 10^6$ N·m$^{-2}$), there is a temperature difference of 40° F. (22.2° C.), i.e., 160–120, between the 0.74 IV sample and the 1.00 IV sample. Thus, increasing the IV produces a desirable increase in strength at elevated temperatures, but again at a cost premium.

There is an ongoing need for a plastic container able to withstand the elevated temperatures and pressures of pasteurization and other high temperature applications, and wherein the container can be manufactured commercially at a price competitive with that of glass containers.

SUMMARY OF THE INVENTION

The present invention is directed to a multilayer container, which can withstand elevated temperatures and pressures (e.g., the pasteurization process) without significant creep and which is commercially cost-effective. For example, in a preferred embodiment the container undergoes an overall volume increase of no greater than about 3.0%, and more preferably no greater than about 2.0%, compared to the as-molded container volume. The invention is also directed to a method of making the container and to multilayer preforms which are expanded to form containers.

In one embodiment, a two-material, three-layer (2M, 3L) container structure includes exterior inner and outer layers of virgin polyethylene terephthalate (PET) homopolymer or copolymer, and an interior core layer of post-consumer PET (PC-PET). PC-PET is available at a 15–25% cost advantage, as compared to 0.80 IV virgin PET resin; the cost difference is even greater with virgin PET above 0.80 IV. This savings enables production of a container with 30–60% PC-PET by total container weight, and the remaining 70–40% of 0.85 (or higher) IV virgin PET, that is cost-competitive with existing glass containers for pasteurization. The higher IV outer layers have a higher $T_g$ for enhanced thermal resistance, while the lower IV core provides the necessary wall thickness for strength at a reduced cost.

An unexpected problem arises when preforms are produced with polymers of substantially different IVs, i.e., a difference (delta) of at least 0.10 dl/g, such as a multilayer structure of 0.73 IV PC-PET and 0.85 IV virgin PET. In an IV delta range of 0.10 to 0.20, one or more layers may separate when the container is dropped from a height of one meter onto a hard rigid surface (e.g., concrete). Still further, if the IV delta exceeds 0.20, layer separation may occur in the preform, immediately following removal from the injection mold.

Layer separation is an important commercial issue for CSD containers which are stored for extended periods of time. Carbon dioxide gas may permeate through the container sidewall into a delaminated layer region, creating a pressurized gas pocket; over time, the pocket may expand to a significant size, rendering the container visually unacceptable.

It has been found that the injection molding and/or blow molding process conditions can substantially diminish or completely eliminate the problem of layer separation for IV deltas on the order of 0.10 or more. More specifically, the rate of injection and amount of pressure applied in the preform mold are increased to insure higher levels of layer bonding. For example, a standard injection molding process for low-IV PET (i.e., 0.70 IV) may utilize an injection rate of 10–12 grams/second, and a mold pressure on the order of 7,000 psi ($50 \times 10^6$ N·m$^{-2}$). In contrast, the injection rate for molding multilayer virgin PET/PC-PET preforms is increased to about 16–20 grams/second (a 50% or greater increase) and the mold pressure to about 9,000 psi ($60 \times 10^6$ N·m$^{-2}$)(about a 30% increase). In a preferred process, the virgin PET is injected at about 16–20 grams/second at a melt temperature of about 275–300° C., and the PC-PET is injected at the same rate at a melt temperature of about 265–290° C. The mold is then packed (to fill any void space created by shrinkage) at a pressure of about 9000–12,000 psi ($60 \times 10^6$ to $85 \times 10^6$ N·m$^{-2}$), for about 2–3 seconds, and then held (in the mold) at a pressure of about 6000 psi ($40 \times 10^6$ N·m$^{-2}$) for about 13–15 seconds before ejection. Still further, the blow molding temperature is preferably about 110° C., to minimize inter-layer stresses during blowing.

It is hypothesized that increasing the IV delta between the virgin PET and PC-PET alters the melt solubility of the materials sufficiently to reduce molecular migration and chain entanglement at the layer boundary, thus decreasing layer adhesion. The enhanced injection rate and pressure overcomes this problem. The exact mold temperature, injection rate, pressure and hold time will vary depending upon the specific polymers used and preform wall thicknesses.

The present invention includes multilayer preforms and other injection-molded articles, as well as various containers, including bottles and cans, made from such preforms. The neck finish of the container may be amorphous, biaxially oriented, an insert molded with a high $T_g$ polymer and/or crystallized, depending on the particular wall thickness and/or applications.

These and other advantages of the present invention will be more particularly described in regard to the following detailed description and drawings of select embodiments.

DETAILED DESCRIPTION

Figure 1:
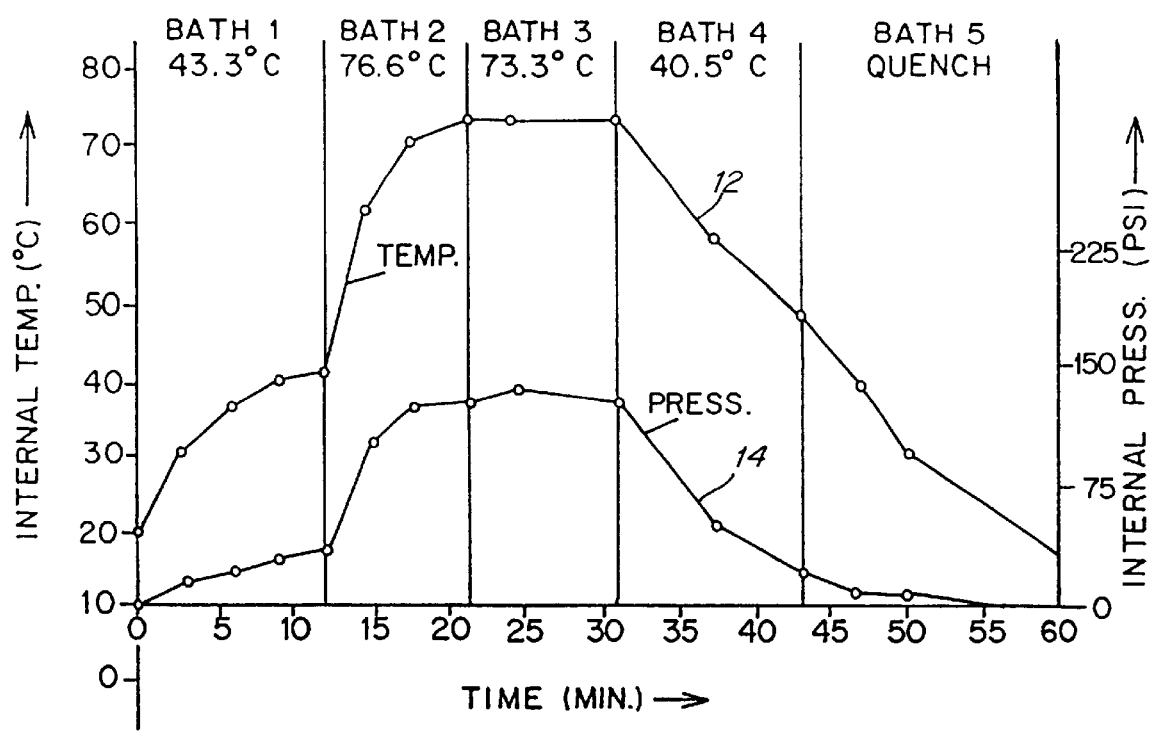
FIG. 1 is a graph illustrating the changes in internal temperature and pressure over a typical pasteurization cycle, for a prior art 16-oz glass container, filled with a juice product carbonated at 2.5 volumes.
Figure 2:
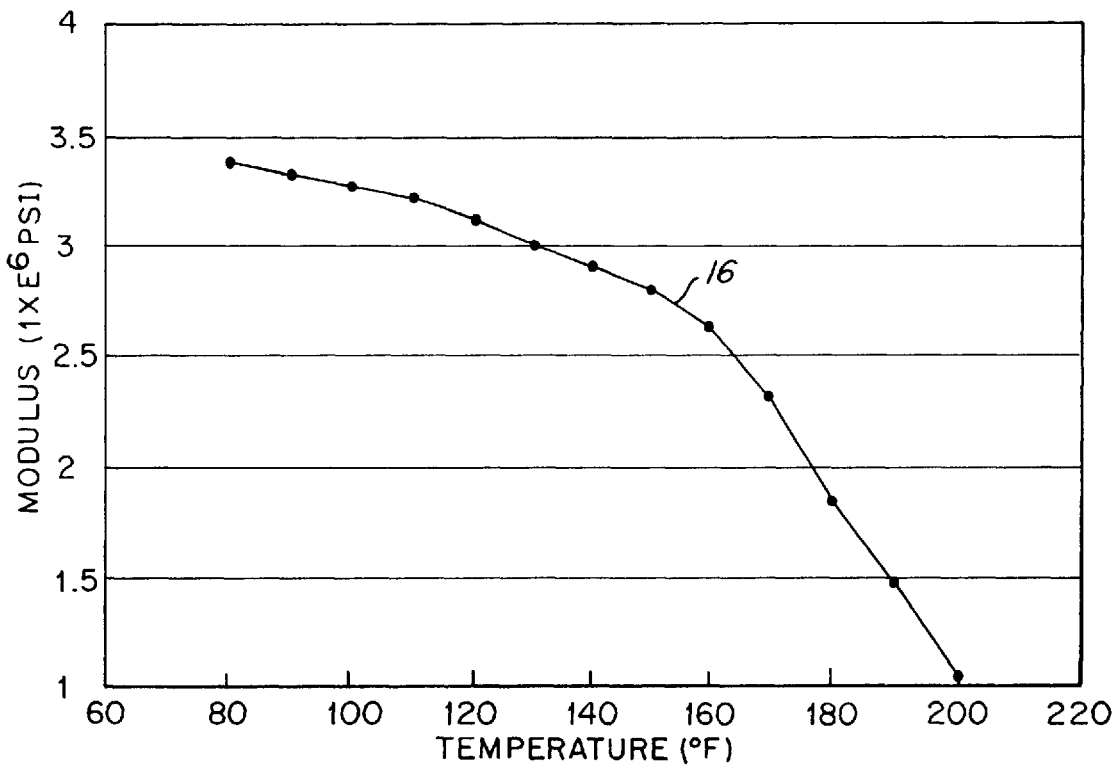
FIG. 2 is a graph of modulus versus temperature for a 0.80 IV PET biaxially-oriented container sample.
Figure 3:
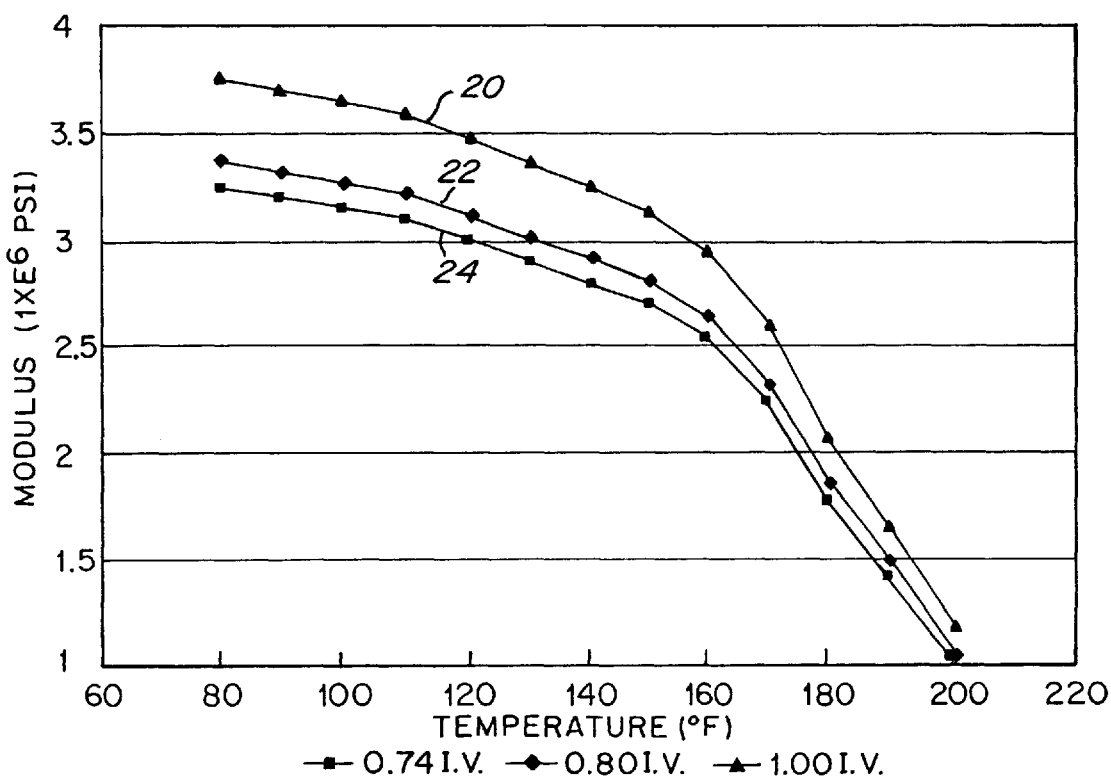
FIG. 3 is a graph similar to FIG. 2, illustrating the change in modulus with temperature for three different IVs.
Figure 4:
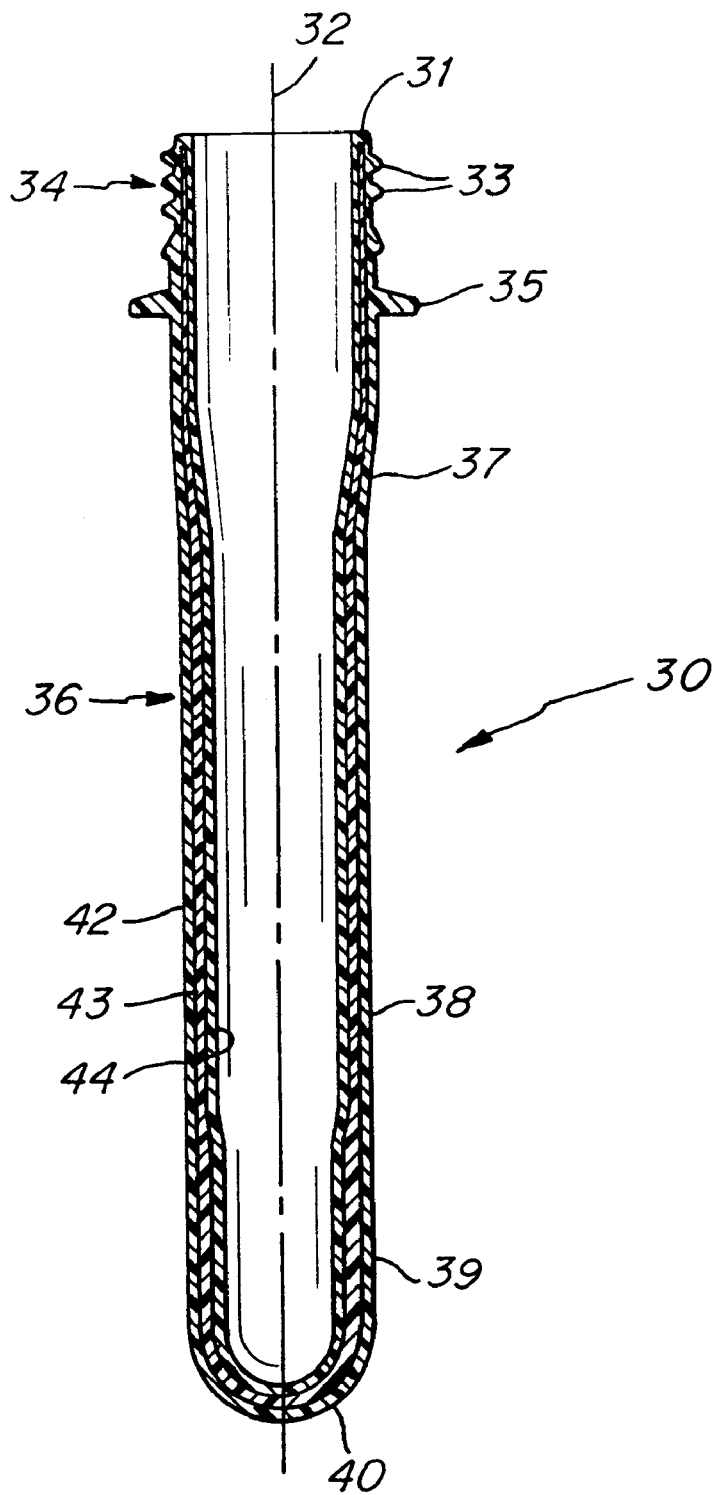
FIG. 4 is a vertical cross-section of a multilayer preform useful in making a container according to one embodiment of the present invention.
Figure 5:
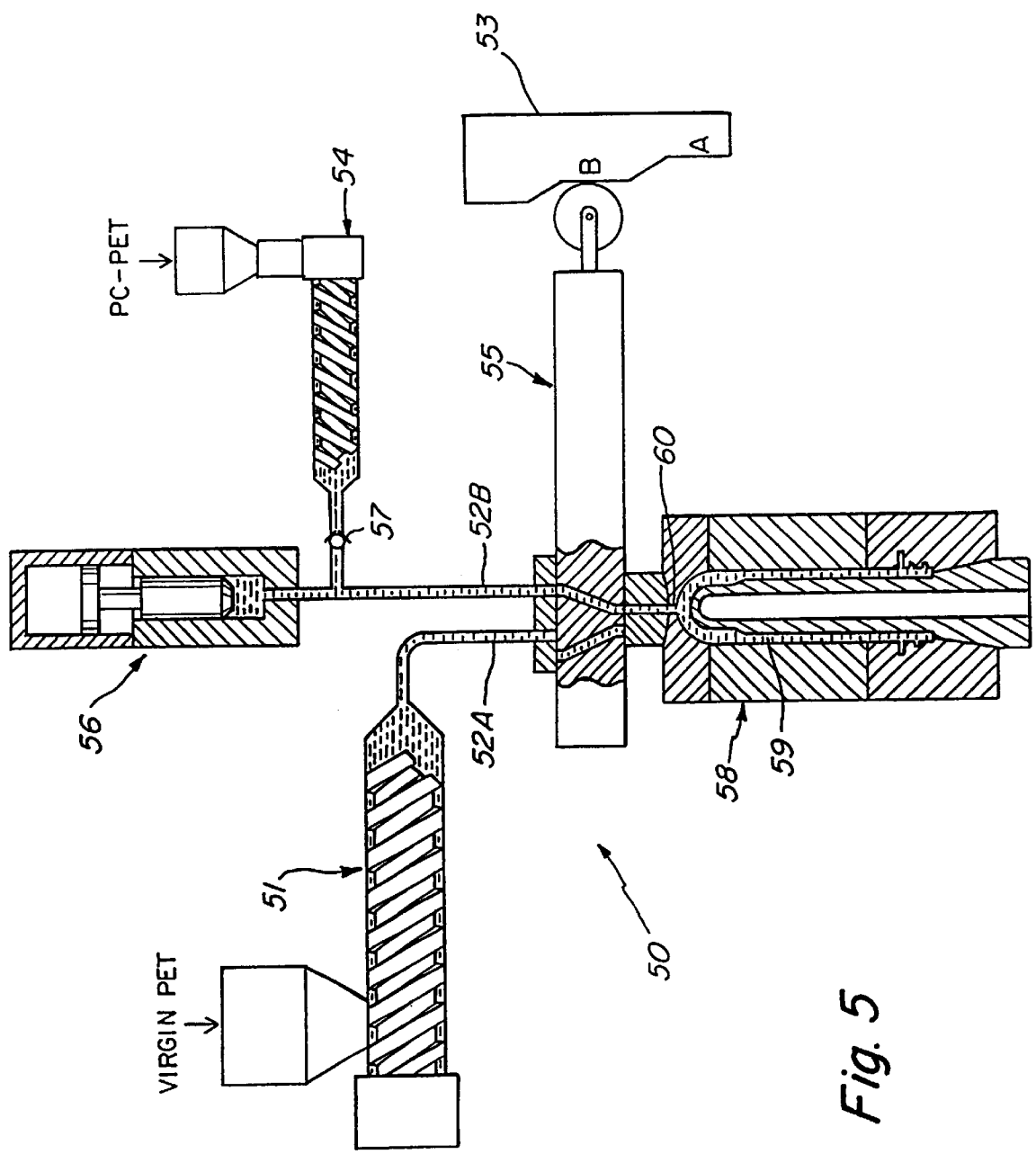
FIG. 5 is a schematic illustration of a two-material, three-layer metered sequential co-injection apparatus for making the preform of FIG. 4.
Figure 6:
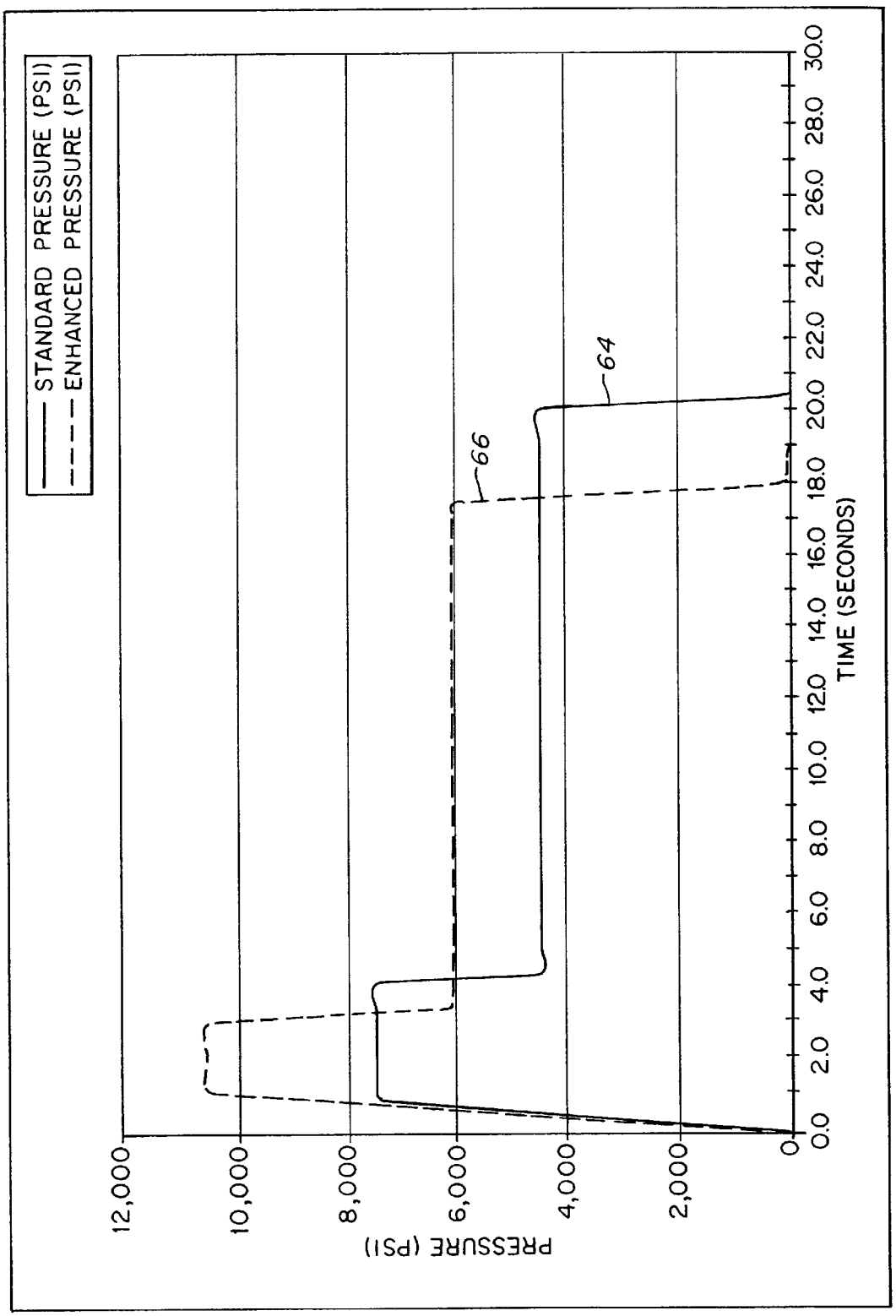
FIG. 6 is a graph of pressure versus time, illustrating by way of example the enhanced injection rate and pressure in a preform mold according to the present invention.

According to a first embodiment, an injection-molded multilayer preform and method of making the same are illustrated in FIGS. 4–6. The preform may be expanded to form a multilayer pasteurizable carbonated beverage container as illustrated in FIGS. 7–10.

FIG. 4 shows a substantially cylindrical preform 30 (defined by vertical center line 32) which includes an upper neck portion or finish 34 integral with a lower body-forming portion 36. The neck portion includes an upper sealing surface 31 which defines the open top end of the preform, and an exterior surface having threads 33 and a lowermost flange 35. Below the neck finish is the body-forming portion 36 which includes a flared shoulder-forming portion 37, increasing (radially inwardly) in wall thickness from top to bottom, a cylindrical panel-forming section 38, having a substantially uniform wall thickness, and a thickened base-forming section 39, which is thicker than the panel-forming section. The bottom end 40 of the preform is substantially hemispherical and may be thinner than the upper base-forming portion.

This preform has a two-material, three-layer (2 M, 3 L) structure and is substantially amorphous and transparent. The multiple preform layers comprise, in serial order: outer layer 42 of virgin PET, core layer 43 of PC-PET, and inner layer 44 of virgin PET. The virgin PET is a homopolymer, or low copolymer with for example 2% isophthalic acid modifier, having an intrinsic viscosity of about 0.90 dl/g. The PC-PET has an intrinsic viscosity of about 0.70.

Figure 8:
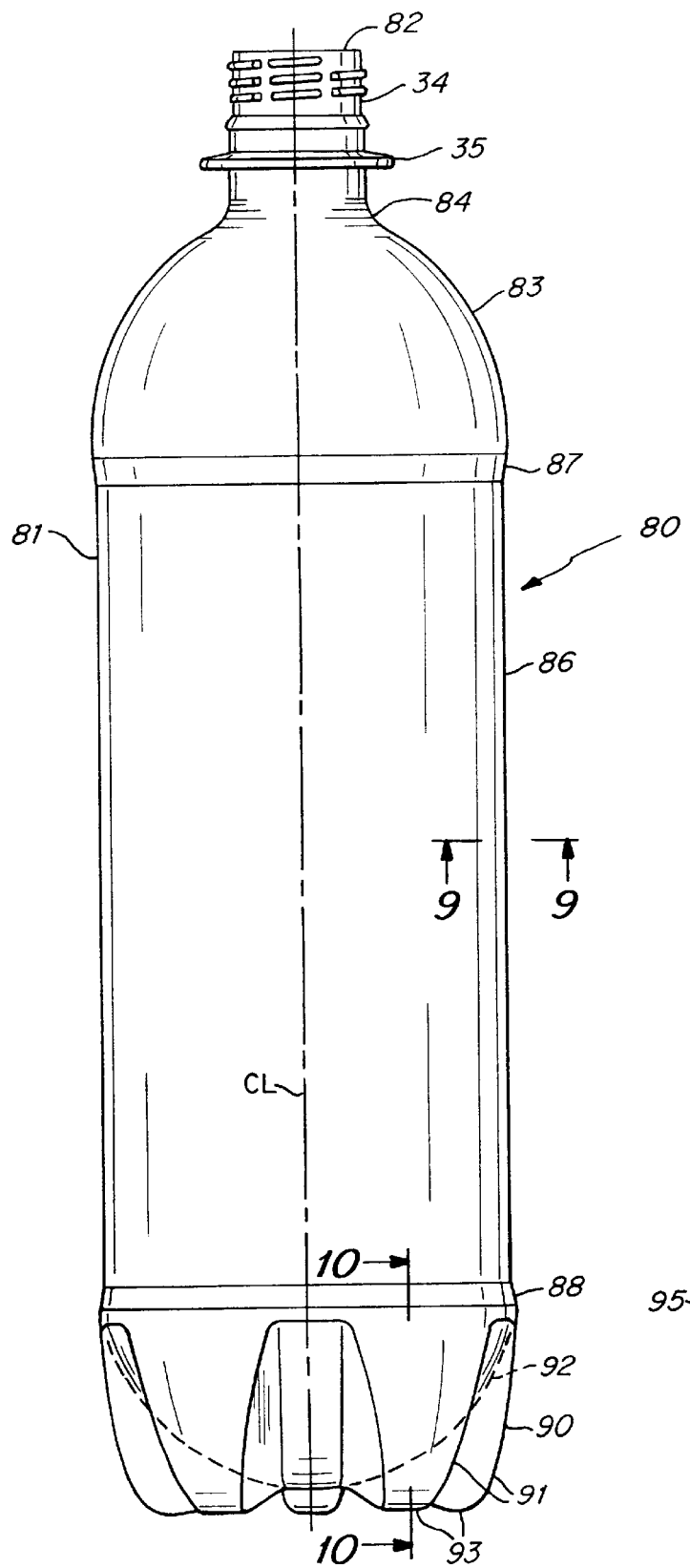
FIG. 8 is a side elevational view of a multilayer pressurized polyester container made according to FIG. 7, which can withstand the elevated temperatures and pressures of the pasteurization process.

This particular preform is designed for making a 1.0 liter pasteurizable carbonated beverage container (as shown in FIG. 8). The preform 30 has a height of about 150 mm, and an outer diameter in the panel-forming section 38 of about 23.8 mm. The total wall thickness of the panel-forming section 38 is about 4.1 mm, and the thicknesses of the various preform sidewall layers are: outer layer 42 and inner layer 44 are each about 1.2 mm thick, and core layer 43 is about 1.7 mm thick. For pasteurizable carbonated beverage containers of about 0.3 to 1.5 liters in volume, having a panel wall thickness of about 0.25 to about 0.38 mm, and filled at about 2.0 to 4.0 volumes, a preferred average planar stretch ratio for the panel section 38 is on the order of 13.0 to 14.5. The planar stretch ratio is the ratio of the average thickness of the preform panel-forming portion 38 to the average thickness of the container panel 86 (in FIG. 8), wherein the "average" is taken along the length of the respective preform and container portions. The average panel hoop stretch is preferably about 4.0 to 4.5 and the average panel axial stretch about 3.0 to 3.2. This produces a container panel 86 with the desired biaxial orientation and visual transparency. The specific panel thickness and stretch ratio selected depend on the dimensions of the bottle, the internal pressure, and the processing characteristics (as determined for example by the intrinsic viscosity of the particular materials employed).

A suitable multilayer preform injection molding apparatus 50 is shown in FIG. 5. The apparatus provides a sequential introduction of two melt streams in a metered fashion and includes:

"A" extruder 51
melt channel from "A" extruder 52A
melt channel from "B" extruder 52B
valve cam 53
"B" extruder 54
melt valve 55
shot pot 56
ball check 57
preform mold 58
preform 59
gate 60

The "A" extruder 51 is charged with 0.90 IV virgin PET resin which has been dried to below 50 ppm moisture content. The virgin PET resin is melted in a screw and barrel, at a barrel temperature of 285° C. The melt is plasticized at 300 psi ($2.07 \times 10^6$ N·m$^{-2}$) and 25 RPM.

The "B" extruder 54 is charged with 0.70 IV PC-PET which has been dried down to 100–150 ppm. The PC-PET is melted in a screw and barrel, at a barrel temperature of 275° C. The melt is plasticized at 270 psi ($1.86 \times 10^6$ N·m$^{-2}$) and 35 RPM.

The process sequence starts once the "A" extruder 51 is fully charged, and the shot pot 56 is fully charged with material from the "B" extruder 54. First, the "A" extruder 51 comes forward injecting virgin PET (for the inner and outer layers) until about 60% of the preform weight has been injected into the mold 58. The "A" injection is preprogramed to stop at this point, thus giving a -predetermined metered virgin PET shot. The melt valve 55 extends fully to a position which provides clearance for the valve cam 53 to shift. The valve cam 53 then shifts to the "B" position and the melt valve 55 is retracted until it rests against the valve cam 53. In this position, the melt channel 52A for the "A" extruder 51 to the preform mold 58 is blocked, but the melt channel 52B for the shot pot 56 to the preform mold 58 is opened. The shot pot 56 extends pushing the PC-PET melt (for the core layer) through the melt valve 55 filling the preform mold 58. The ball check 57 prevents the flow of melt back into the "B" extruder 54. When the shot pot 56 is empty, the melt valve 55 again extends fully for enough time that the valve cam 53 can shift back to the "A" position. The melt valve 55 then pulls back until it rests again on the valve cam 53. In this position, the melt channel 52B from the shot pot 56 to the preform mold is blocked, but the melt channel 52A from the "A" extruder 51 to the preform mold 58 is opened. The "A" extruder 51 again comes forward and packs the mold against shrinkage of the preform 59 and clears the PC-PET from the gate 60. After packing, the mold pressure is partially reduced and held while the preform cools. The "A" extruder 51 plasticizes material for the next shot, and the "B" extruder 54 plasticizes material for the next shot, pushing it through the melt channel 52B and into the shot pot 56. The machine is now ready for the next cycle.

FIG. 6 is a graph of pressure versus time showing the difference between a standard injection cycle 64 and the enhanced injection cycle 66 of the present invention. The standard curve 64 is for a 2-material, 3-layer preform structure including a first shot of about 0.70 IV virgin PET resin, and a second shot of about 0.70 IV PC-PET resin. In the standard process, each of the polymer melts are injected into the mold at a rate of about 10–12 grams/second, a packing pressure of about 7500 psi ($50 \times 10^6$ N·m$^{-2}$) is applied for about four seconds, and the pressure is then dropped to about 4500 psi ($30 \times 10^6$ N·m$^{-2}$) for the next 15 seconds, after which the pressure is released and the preform is ejected from the mold. The second curve 66 shows the enhanced process of this invention. Both materials (0.90 virgin PET and 0.70 PC-PET) are injected at a rate of about 16–20 grams/second, the packing pressure is held at about 10,500 psi ($70 \times 10^6$ N·m$^{-2}$) for about three seconds, the pressure is dropped to about 6,000 psi ($40 \times 10^6$ N·m$^{-2}$) for the next 15 seconds, and then the pressure is released and the preform ejected from the mold. Increasing the pressures (above previous levels) is believed to force higher levels of interlayer bonding, which may include chain entanglement, hydrogen bonding, low-level interlayer crystallization and layer penetration. The increased pressure holds the preform against the cold mold wall to solidify the preform without haze (i.e., loss of transparency), at the minimum possible cycle time. Reduction of the hold time may be desirable to avoid pushing a solidified gate into a molten preform base, which would result in plastic deformation and weakness in the gate area. In addition, it is believed that faster injection rates yield higher melt temperatures within the injection cavity, resulting in increased polymer mobility which improves migration and entanglement during the enhanced pressure portion of the injection cycle. As an additional option, increasing the average preform temperature (e.g., in this example to 115° C.) and/or decreasing the temperature gradient through the preform wall (e.g., in this example to less than 5° C. temperature difference), may further reduce layer separation by minimizing shear at the layer boundaries during container inflation.

Figure 7:
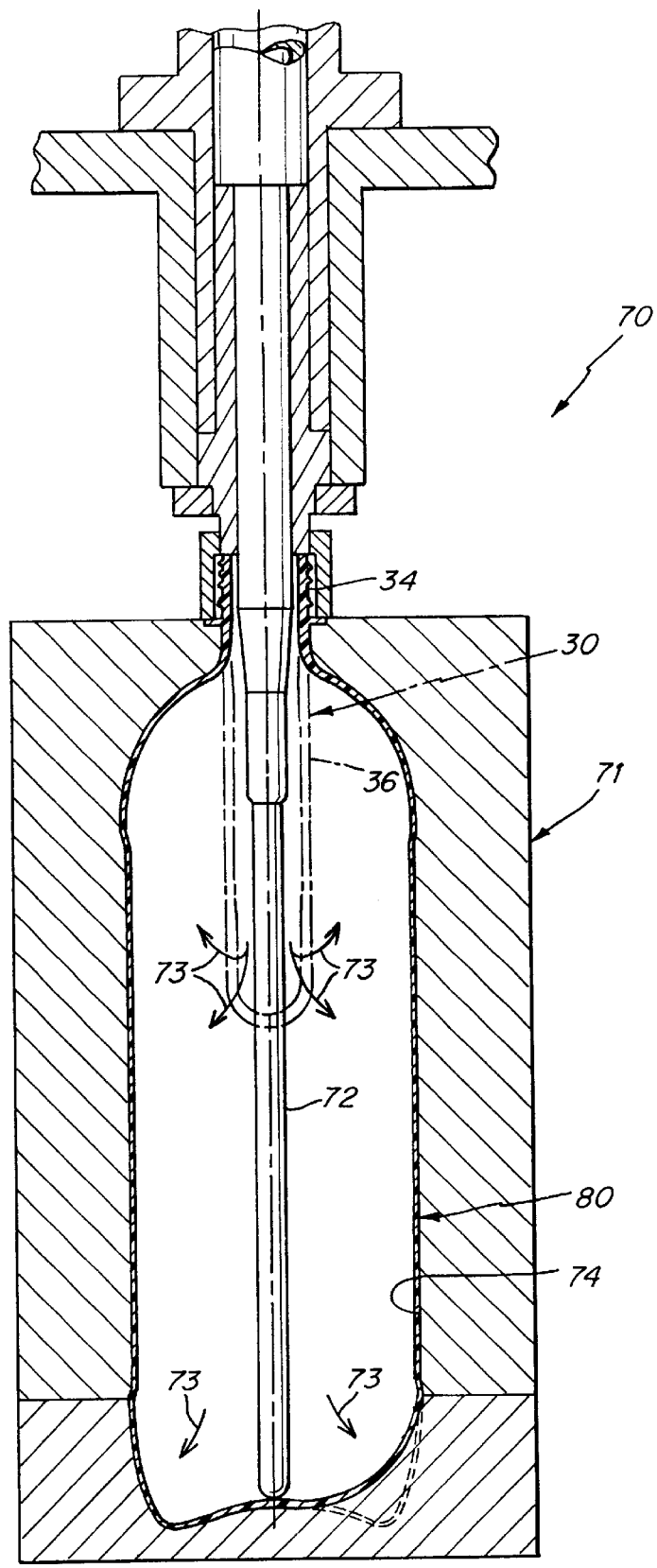
FIG. 7 is a vertical cross-section of a blow-molding apparatus for making an exemplary container of the present invention.

FIG. 7 illustrates a stretch blow-molding apparatus 70 for making a container from the preform 30. More specifically, the substantially amorphous and transparent preform body section 30 (of FIG. 4) is reheated to a temperature above the glass transition temperatures of the PET and PC-PET layers, and then positioned in a blow mold 71. A stretch rod 72 axially elongates (stretches) the preform within the blow mold to ensure complete axial elongation and centering of the preform. The thickened base-forming region 39 of the preform resists axial deformation compared to the panel- and shoulder-forming portions 38 and 37; this produces greater axial elongation in the resulting panel and shoulder portions of the container. A blowing gas (shown by arrows 73) is introduced to radially inflate the preform during axial stretching in a customary manner to match the configuration of an inner molding surface 74 of the blow mold. The formed container 80 is substantially transparent but has undergone strain-induced crystallization to provide increased strength (to withstand carbonation and the increased pressure during pasteurization).

FIG. 8 shows a 1.0 liter pasteurizable multilayer beverage bottle 80 made from the preform of FIG. 4. The tubular body-forming portion 36 of the preform has been expanded to form a substantially transparent, biaxially-oriented container body 81. The upper thread finish 34 has not been expanded, but is of sufficient thickness or material construction to provide the required strength. The bottle has an open top end 82 and receives a screw-on cap (see FIGS. 11–12). The expanded container body 81 includes:

(a) an upper flared shoulder section 83 with an outwardly-protruding profile, and which generally increases in diameter from below the neck finish flange 35 to a cylindrical panel section 86; it is preferable to provide a rounded (hemispherical) shoulder 83 because this shape maximizes the biaxial orientation and minimizes the applied stress levels. Higher orientation and lower stress will lower the volume increase due to creep at elevated temperatures; this will minimize any drop in the fill level if there is creep during pasteurization; also, it is preferable to provide a small transition radius 84 between the neck finish 34 and shoulder 83 to minimize the unoriented area at the top of the shoulder (an unoriented area may be prone to creep);

(b) the substantially cylindrical panel section 86 preferably has a relatively tall and slender configuration, i.e., a height to diameter ratio on the order of 2.0 to 3.0, in order to minimize the stress in the sidewall (and minimize creep); relatively shallow transition regions 87 and 88 are provided at the upper and lower ends of the panel 86, respectively; larger transition areas would be more likely to expand (straighten) during pasteurization and cause a volume increase (fill level drop); for the same reason, preferably no ribs are provided in the panel section 86;

(c) a footed base 90 has a substantially hemispherical bottom wall 92 and for example, five legs 91 which extend downwardly from the bottom wall to form five foot pads 93 on which the container rests; the legs 91 are symmetrically disposed around the container circumference; in addition, it is preferable to provide a high depth base, i.e., close to a hemispherical base, in order to maximize strength and resistance against creep; it is also preferable to provide an angled foot pad which can move outwardly under creep and yet remain within the diameter of the container.

The panel-forming section 38 of the preform may be stretched at an average planar stretch ratio on the order of 13.0 to 14.5; the virgin PET layers of the resulting panel section 86 have an average crystallinity on the order of 20% to 30%, and preferably on the order of 25% to 29%. The shoulder 83 undergoes an average planar stretch ratio of about 10.0 to 12.0; the virgin PET layers of the resulting shoulder 83 have an average crystallinity of about 20% to 25%. The hemispherical bottom wall 92 in the base undergoes an average planar stretch of about 5.0 to 7.0 and the virgin PET layers have about 5% to 15% average crystallinity; the legs and feet undergo an average planar stretch of about 13.0 to 14.0, and the virgin PET layers have about 20% to 26% average crystallinity. The core PC-PET layer has somewhat less crystallinity in each respective region.

Figure 9:
FIG. 9 is a horizontal cross-section taken along line 9—9 of FIG. 8, showing the multilayer sidewall of the container.

FIG. 9 shows a cross-section of the panel wall 86, including inner layer 95 of virgin PET, core layer 96 of PC-PET, and outer layer 97 of virgin PET. In this embodiment, the relative percent by total weight of the various layers in the panel section are about 30% for inner layer 95, about 40% for core layer 96, and about 30% for outer layer 97.

Figure 10:
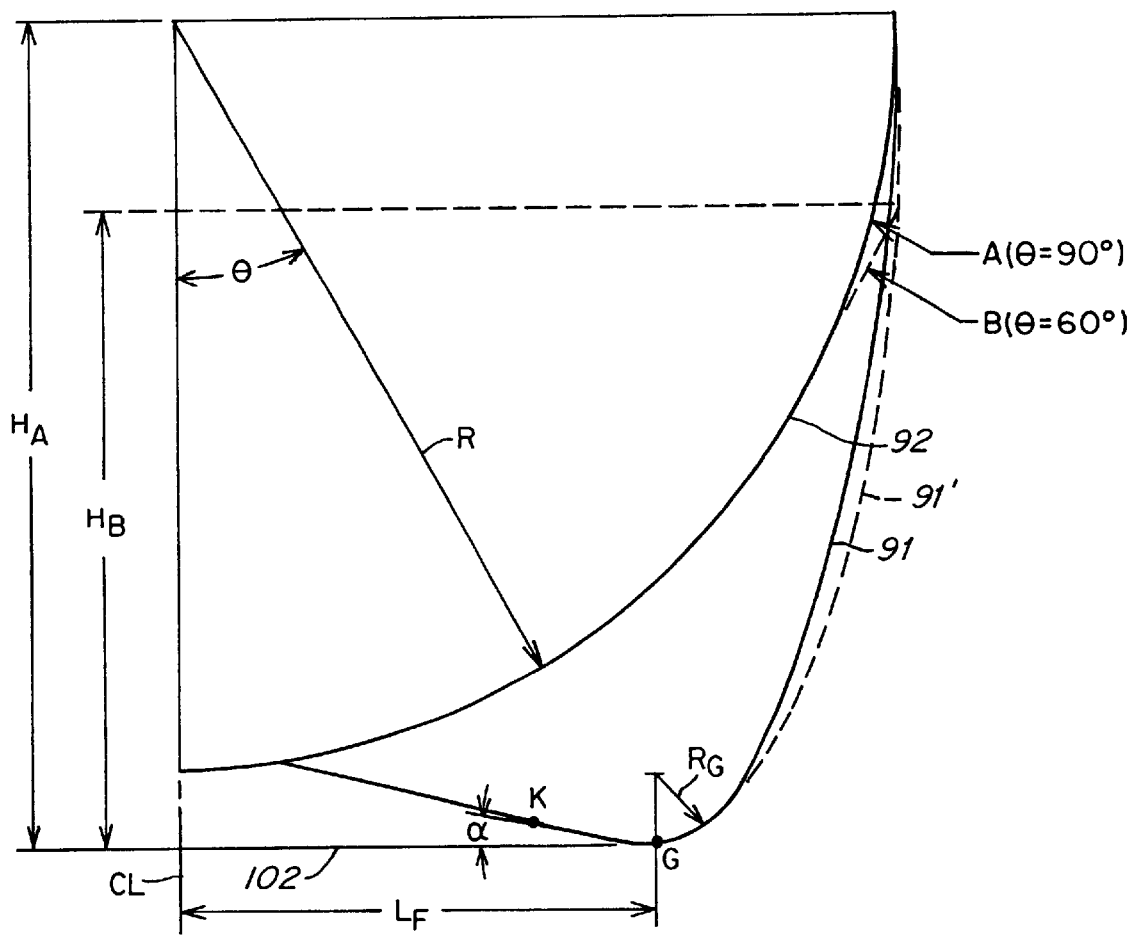
FIG. 10 is a vertical cross-section taken along line 10—10 of FIG. 8, showing one foot of the container base.

The preferred features of the footed container base are shown more clearly in FIG. 10. As a basis of comparison, a known five-foot PET disposable carbonated beverage container (non-pasteurizable) has a relatively low base profile (θ of about 45°). In contrast, the present base preferably has a relatively high base profile on the order of 60° or better. FIG. 10 shows in solid lines a base having a full hemisphere A where θ=90°, and in dashed lines a truncated hemisphere B where θ=60°, θ being the angle that the radius R, defining the hemispherical bottom wall 92, extends from the vertical centerline (CL) of the container body. The relative heights of the base are illustrated as $H_A$ for the full hemi, and $H_B$ for the truncated hemi. It is preferable to provide a base height between $H_B$ and $H_A$, and more preferably where θ is greater than 65°.

In addition, it is preferable to provide an angled foot pad. The foot pad extends between points G and K on the leg 91 (for θ=90°), or 91' (for θ=60°). The foot pad is preferably spaced a distance $L_F$ from the vertical centerline CL to a point G which is vertically aligned with a center point of radius $R_G$. Radius $R_G$ forms the outer edge of the foot pad. The foot pad forms an angle α with a horizontal surface 102 on which the base rests. Preferably, $L_F$ is on the order of 0.32R to 0.38R, and α is on the order of 5° to 10°, to allow each foot pad and leg to move out under creep, and yet remain within the diameter of the container.

Figure 11:
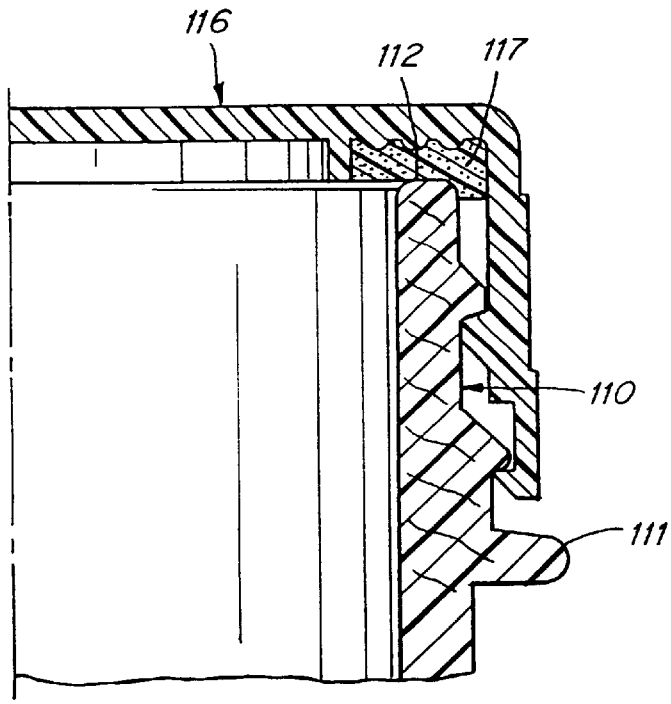
FIG. 11 is an enlarged fragmentary cross-section of a crystallized neck finish and cap, according to one embodiment.

FIG. 11 is an enlarged cross-section of an opacified neck finish enclosure according to one embodiment. More specifically, the unoriented neck finish 110 has been thermally crystallized (opacified) by for example, high-temperature exposure; this increases the strength and enhances its resistance to the increased temperature and pressure of pasteurization. The heat-treated area may extend just below the flange 111. A cap 116 has an annular ring 117 of a resilient material (e.g., plastisol or other thermoplastic elastomer) which seals an upper surface 112 of the neck finish. If there is any deformation of the neck finish during pasteurization, the liner 117 deforms to ensure a tight seal and prevent leakage.

Figure 12:
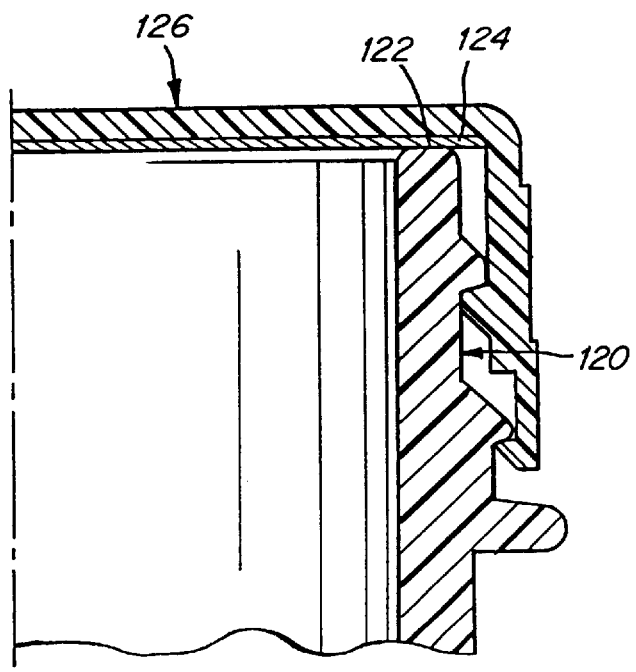
FIG. 12 is an enlarged fragmentary cross-section of an amorphous neck finish and cap, according to another embodiment.

In an alternative embodiment shown in FIG. 12, a substantially amorphous and unoriented neck finish 120 is provided, i.e., it has not been crystallized. In this case, the amorphous neck finish is provided with a laminated foil liner 124, which lies within an inner surface of a cap 126, and which may, for example, be heat sealed or adhesively sealed to an upper surface 122 of the neck finish. Again, if there is any deformation of the neck finish, the liner 124 ensures a tight seal to prevent leakage.

Figure 13:
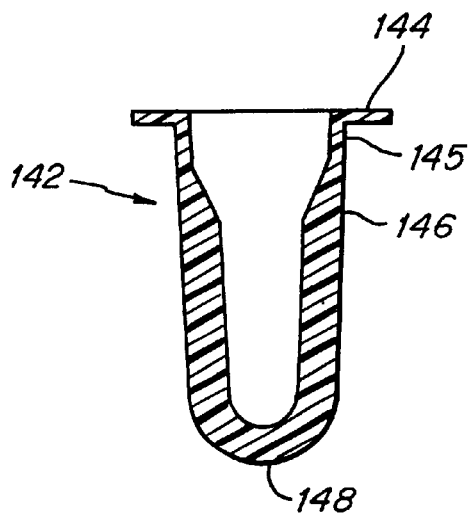
FIG. 13 is a schematic sectional view through a preform used in an alternative embodiment to make a can.
Figure 14:
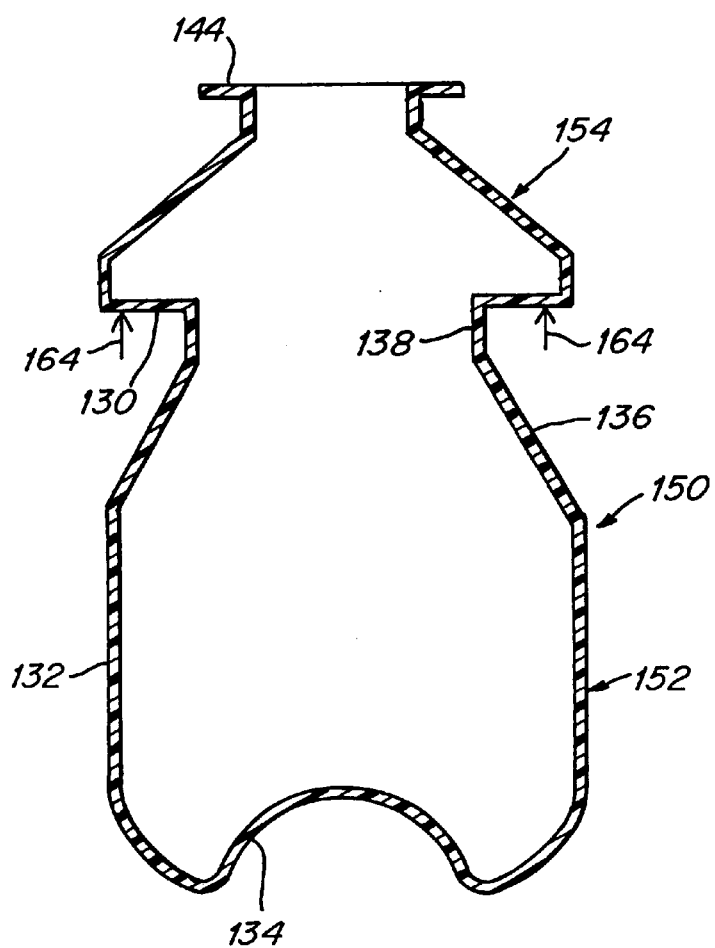
FIG. 14 is a schematic sectional view of an intermediate article made from the preform of FIG. 13, including as a lower portion a can which is biaxially-oriented up through the finish, and an upper portion which is removed and discarded.

In yet another embodiment, a relatively wide mouth container such as a can is formed according to the present invention. The can may be formed from a preform according to the process described in U.S. Pat. No. 4,496,064 to Beck et al., which issued Jan. 29, 1985, and which is hereby incorporated by reference in its entirety. FIG. 13 shows a preform 142 (from the Beck patent) which includes a support flange 144, a thin upper body portion 145 which flares into a thick generally cylindrical main body portion 146, and a generally hemispherical bottom portion 148. The Beck process enables a high degree of biaxial orientation to be obtained in all portions of the resulting container, e.g., can, so that the container may have economical thin walls while having the desired strength characteristics. In this case, the preform is expanded to form an intermediate article 150, which includes a lower portion 152 in the form of the desired container, and an upper portion 154. The lower portion includes a cylindrical body 132, concave bottom 134, tapered shoulder 136, mouth 138, and annular flange 130. The upper portion is severed from the flange 130 at part 164 (as by cutting or laser trimming, and discarded or ground and the material reused). It is not necessary to thermally crystallize or otherwise reinforce the upper end of the container, because the biaxial orientation provides the necessary strength. A method of trimming the expanded preform to remove the upper unoriented portion is described in U.S. Pat. No. 4,539,463 to Piccioli et al., which issued Sep. 3, 1985, and is hereby incorporated by reference in its entirety. In a typical PC-PET/PET can application, the IVs of adjacent layers may be about 0.6 and 0.8 dl/g; in a PC-PET/PET bottle application, they would more typically be on the order of 0.7 and 0.9 dl/g.

Figure 15:
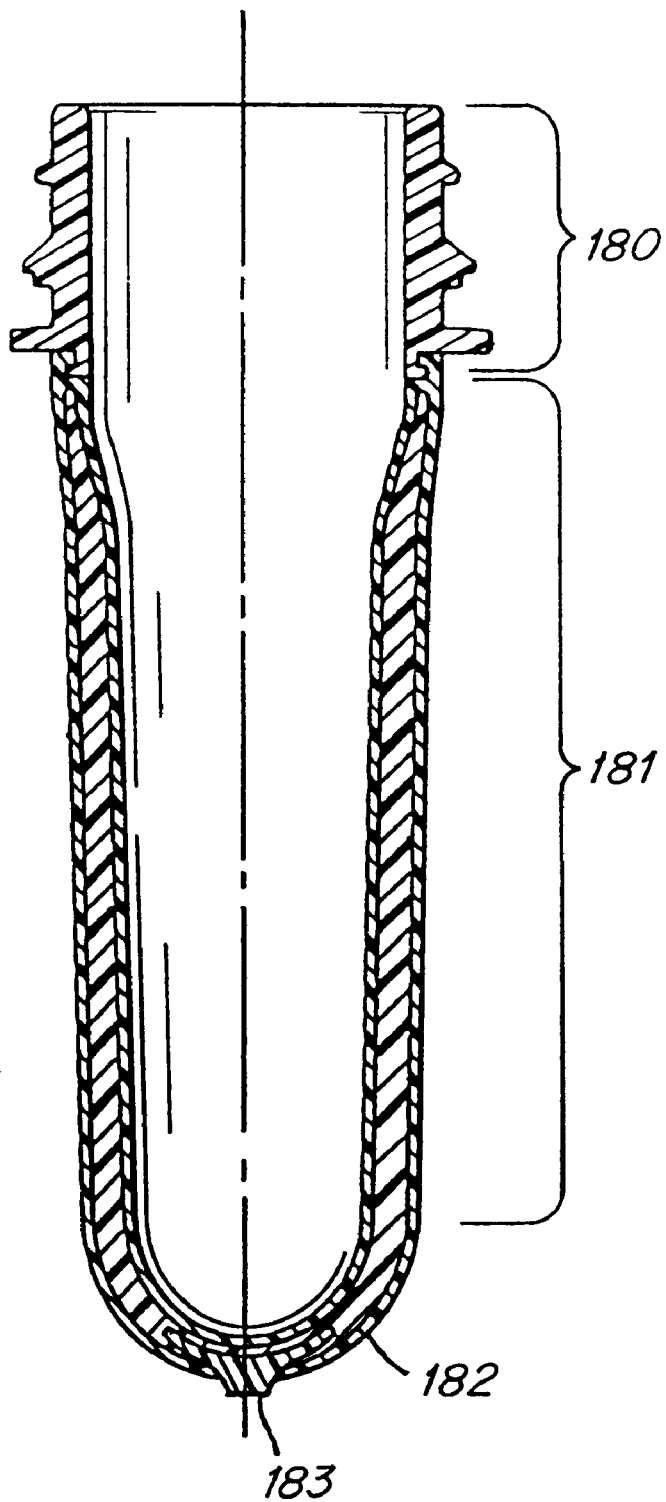
FIG. 15 is a schematic sectional view through a preform according to another embodiment having a neck finish insert and multilayer body- and base-forming portions.

Yet another method for providing a multilayer expanded preform container with a crystallized neck finish is described in U.S. Ser. No. 08/534,126, now U.S. Pat. No. 6,217,818 entitled "Preform And Container With Crystallized Neck Finish And Method Of Making The Same," which was filed Sep. 26, 1995 by Collette et al., and which is hereby incorporated by reference in its entirety. As described therein, an indexer (e.g., rotary or oscillatory) has two faces, each with a set of preform molding cores, and simultaneously positions the two core sets in two different sets of preform molding cavities. In the first set of cavities (first molding station), a high $T_g$ amorphous or crystallized neck portion is formed on one set of cores, while in the other set of cavities (second molding station) a plurality of amorphous body-forming portions are formed on the other set of cores. The cores are sequentially positioned in each of the first and second molding stations. By simultaneously molding in two sets of cavities, an efficient process is provided. By molding the neck and body-forming portions separately in different cavities, different temperatures and/or pressures may be used to obtain different molding conditions and thus different properties in the two preform portions. For example, as shown in FIG. 15, in one embodiment a polyester preform (for making a hot-fillable container has a crystallized neck portion 180 of CPET, a terephthalic polyester with nucleating agents which render the polymer rapidly crystallizable during injection molding. CPET is sold by Eastman Chemical Company, Kingsport, Tenn. The body-forming portion 181 is a two-material, three-layer (2M, 3L) structure, including inner and outer layers of virgin polyethylene terephthalate (PET), and a core layer of for example post-consumer PET (PC-PET). The base-forming portion 182 is similar to the body-forming portion, but may include a core layer 183 of virgin PET in at least the bottom part and possibly extending through to the exterior of the preform. Alternatively, the core layer 183 in the base may be of a higher $T_g$ polymer to enhance the thermal stability of the resulting container base; this is particularly useful with champagne-type container bases. The higher $T_g$ polymer may be injected via a third extruder. Numerous alternative high-glass transition ($T_g$) polymers may be used in place of CPET, such as arylate polymers, polyethylene naphthalate (PEN) homopolymers, copolymers or blends, polycarbonates, etc. As for the body-forming portion, numerous alternative polymers and layer structures are possible, incorporating PEN, ethylene/vinyl alcohol (EVOH) or MXD-6 nylon barrier layers, oxygen scavenging polymers, etc. The container is useful in a variety of applications, including refillable, pasteurizable, and hot-fillable containers.

Although particular embodiments of the present invention have been described, various modifications will be readily apparent to a person skilled in the art and are included herein.

For example, one or more layers of the preform and container, or portions thereof, can be made of various other polymers, such as polyolefins (e.g., polypropylene and polyethylene), polyvinyl chloride, polyarcylate, etc. Suitable polyesters include homopolymers, copolymers or blends of polyethylene terephthalate (PET), polybutylene terephthalate (PBT), polypropylene terephthalate (PPT), polyethylene napthalate (PEN), and a cyclohexane dimethanol/PET copolymer, known as PETG (available from Eastman Chemical Company, Kingsport, Tenn.). Polyesters based on terephthalic or isophthalic acid are commercially available and convenient. The hydroxy compounds are typically ethylene glycol and 1,4-di-(hydroxy methyl)-cyclohexane. In general, the phthalate polyester may include polymer linkages, side chains, and end groups not related to the formal precursors of a simple phthalate polyester previously specified. Conveniently, at least 90 mole percent will be terephthalic acid and at least 90 mole percent an aliphatic glycol or glycols, especially ethylene glycol.

Post-consumer PET (PC-PET) is prepared from PET plastic containers and other recyclables that are returned by consumers for a recycling operation, and has now been approved by the FDA for use in certain food containers. PC-PET is known to have a certain level of I.V. (intrinsic viscosity), moisture content, and contaminants. For example, typical PC-PET (having a flake size of one-half inch maximum), has an I.V. average of about 0.66 dl/g, a moisture content of less than 0.25%, and the following levels of contaminants:

PVC: <100 ppm aluminum: <50 ppm olefin polymers (HDPE, LDPE, PP): <500 ppm paper and labels: <250 ppm colored PET: <2000 ppm other contaminants: <500 ppm PC-PET may be used alone or in one or more layers for reducing the cost or for other benefits.

Figure 16:
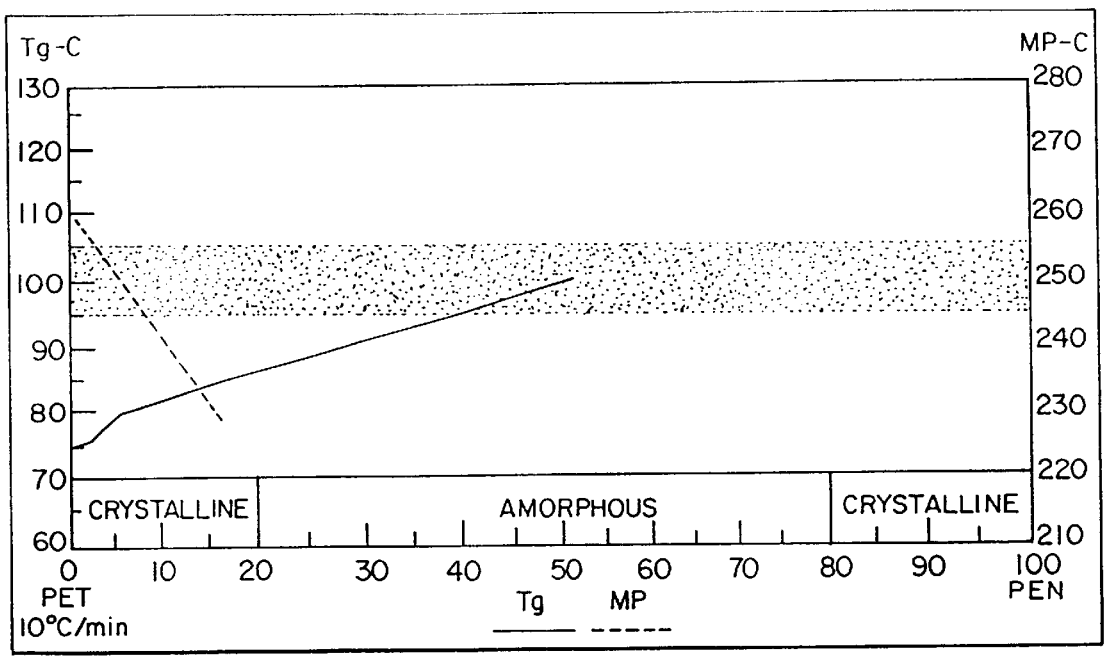
FIG. 16 is a graph of glass transition temperature ($T_g$) and melting temperature ($T_m$) for various "low-PEN" compositions of PET and PEN, useful in moderate-temperature applications.
Figure 17:
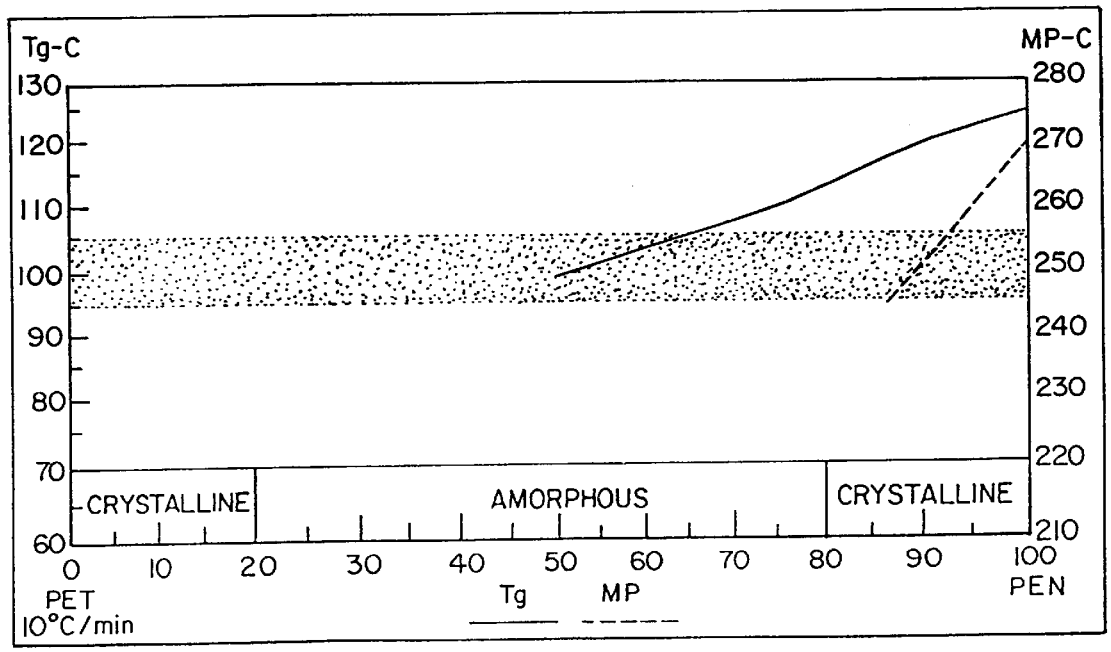
FIG. 17 is a graph of $T_g$ and $M_p$ for various "high-PEN" compositions of PET and PEN, useful in high-temperature applications.

Also useful as a high-oxygen barrier layer is a packaging material with physical properties similar to PET, namely polyethylene naphthalate (PEN). PEN provides a 3–5× improvement in barrier property and enhanced thermal resistance, at some additional expense. Polyethylene naphthalate (PEN) is a polyester produced when dimethyl 2,6-naphthalene dicarboxylate (NDC) is reacted with ethylene glycol. The PEN polymer comprises repeating units of ethylene 2,6 naphthalate. PEN resin is available having an inherent viscosity of 0.67 dl/g and a molecular weight of about 20,000 from Amoco Chemical Company, Chicago, Ill. PEN has a glass transition temperature $T_g$ of about 123° C., and a melting temperature $T_m$ of about 267° C. PET and PEN may be blended or copolymerized in various amounts as shown in FIGS. 16–17. In the ranges of about 0–20% PEN and 80–100% PEN, the material is crystalline, while from about 20–80% PEN the material is substantially amorphous.

The structures of PET and PEN are shown below:

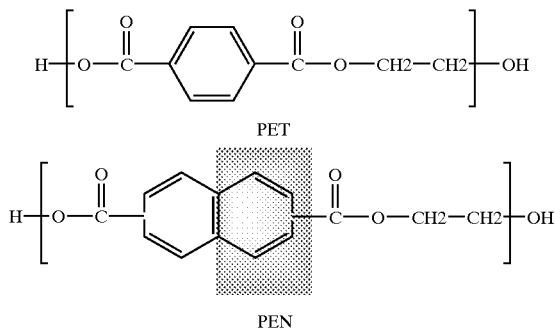

PET

PEN

Suitable polyamides (PA) include PA6, PA6,6, PA6,4, PA6,10, PA11, PA12, etc. Other options include acrylic/amide, amorphous nylon, polyacrylonitrile (PAN), polystyrene, crystallizable nylon (MXD-6), polyethylene (PE), polypropylene (PP), and polyvinyl chloride (PVC).

The multilayer preform/container may also include one or more layers of an oxygen barrier material such as ethylene/vinyl alcohol (EVOH), PEN, polyvinyl alcohol (PVOH), polyvinyldene chloride (PVDC), nylon 6, crystallizable nylon (MXD-6), LCP (liquid crystal polymer), amorphous nylon, polyacrylonitrile (PAN) and styrene acrylonitrile (SAN).

The intrinsic viscosity (I.V.) effects the processability of the resins. Polyethylene terephthalate having an intrinsic viscosity of about 0.8 is widely used in the carbonated soft drink (CSD) industry. Polyester resins for various applications may range from about 0.55 to about 1.04, and more particularly from about 0.65 to 0.85 dl/g. Intrinsic viscosity measurements of polyester resins are made according to the procedure of ASTM D-2857, by employing 0.0050±0.0002 g/ml of the polymer in a solvent comprising o-chlorophenol (melting point 0° C.), respectively, at 30° C. Intrinsic viscosity (I.V.) is given by the following formula:

$$I.V.=(\ln(V_{soln.}/V_{sol.}))/C$$

where:

$V_{Soln.}$ is the viscosity of the solution in any units;

$V_{Sol.}$ is the viscosity of the solvent in the same units; and

C is the concentration in grams of polymer per 100 mls of solution.

The blown container body should be substantially transparent. One measure of transparency is the percent haze for transmitted light through the wall ($H_T$) which is given by the following formula:

$$H_T=[Y_d \div (Y_d+Y_s)] \times 100$$

where $Y_d$ is the diffuse light transmitted by the specimen, and $Y_s$ is the specular light transmitted by the specimen. The diffuse and specular light transmission values are measured in accordance with ASTM Method D 1003, using any standard color difference meter such as model D25D3P manufactured by Hunterlab, Inc. The container body should have a percent haze (through the panel wall) of less than about 10%, and more preferably less than about 5%.

The preform body-forming portion should also be substantially amorphous and transparent, having a percent haze across the wall of no more than about 10%, and more preferably no more than about 5%.

The container will have varying levels of crystallinity at various positions along the height of the bottle from the neck finish to the base. The percent crystallinity may be determined according to ASTM 1505 as follows:

$$\% \text{ crystallinity}=[(ds-da)/(dc-da)] \times 100$$

where ds=sample density in g/cm$^3$, da=density of an amorphous film of zero percent crystallinity, and dc=density of the crystal calculated from unit cell parameters. The panel portion of the container is stretched the greatest and preferably has an average percent crystallinity of at least about 15%, and more preferably at least about 20%. For primarily PET polymers, a 25 to 29% crystallinity range is useful in the panel region.

Further increases in crystallinity can be achieved by heat setting to provide a combination of strain-induced and thermal-induced crystallization. Thermal-induced crystallinity is achieved at low temperatures to preserve transparency, e.g., holding the container in contact with a low temperature blow mold. In some applications, a high level of crystallinity at the surface of the sidewall alone is sufficient.

As a further alternative, the preform may include one or more layers of an oxygen-scavenging material. Suitable oxygen-scavenging materials are described in U.S. Ser. No. 08/355,703 filed Dec. 14, 1994 by Collette et al., entitled "Oxygen Scavenging Composition For Multilayer Preform And Container," which is hereby incorporated by reference in its entirety. As disclosed therein, the oxygen scavenger may be a metal-catalyzed oxidizable organic polymer, such as a polyamide, or an anti-oxidant such as phosphite or phenolic. The oxygen scavenger may be mixed with PC-PET to accelerate activation of the scavenger. The oxygen scavenger may be advantageously combined with other thermoplastic polymers to provide the desired injection molding and stretch blow molding characteristics for making substantially amorphous injection molded preforms and substantially transparent biaxially-oriented polyester containers. The oxygen scavenger may be provided as an interior layer to retard migration of the oxygen scavenger or its byproducts, and to prevent premature activation of the scavenger.

Although certain preferred embodiments of the invention have been specifically illustrated and described herein, it is to be understood that variations may be made without departing from the spirit and scope of the invention as defined by the appended claims.

What is claimed is:

1. A biaxially-oriented multilayer container expanded from an injection molded preform, having a first injection molded layer of a first thermoplastic material comprising virgin polyethylene terephthalate (PET) having a first intrinsic viscosity (IV) of at least about 0.85 dl/g, and a second injection molded layer adjacent to the first layer of a second thermoplastic material comprising a polyester having a second IV which is at least about 0.10 dl/g less than the first IV, wherein the container can withstand a 1 meter drop onto a hard rigid surface without separation of the first and second layers.

2. The container of claim 1, wherein the second IV differs by at least about 0.20 dl/g from the first IV.

3. The container of claim 1, wherein the second thermoplastic material is post-consumer PET (PC-PET).

4. The container of claim 1, wherein the first IV is at least about 0.90 dl/g.

5. The container of claim 4, wherein the second IV is no greater than about 0.75 dl/g.

6. The container of claim 1, wherein the container when filled with a pressurized liquid of 2.5 volumes, sealed and then exposed to an elevated temperature of 75° C. for 10 minutes, undergoes an overall volume change of no greater than about 3%.

7. The container of claim 6, wherein the overall volume change is no greater than about 2%.

8. The container of claim 4, wherein the the first material forms an exterior inner layer and an exterior outer layer and the second material forms an interior layer.

9. The container of claim 1, wherein the first material forms an exterior inner layer and an exterior outer layer and the second material forms an interior layer.

10. The container of claim 1, further including: a third layer adjacent one of the first and second layers, the third material having a third IV which differs by at least 0.10 dl/g from the IV of the material of the adjacent one of the first and second layers.

11. The container of claim 10, wherein the first and second materials form at feast a sidewall portion of the container, and the third material is included in a base portion of the container.

12. The container of claim 11, wherein the first and third materials have a higher IV than the second material.

13. The container of claim 3, having a generally cylindrical panel portion with a height-to-diameter ratio on the order of 2.0 to 3.0, a panel wall thickness on the order of 0.25 to 0.38 mm, and an average planar stretch ratio in the panel portion on the order of 13.0 to 14.5, and a base having a substantially hemispherical bottom wall and a plurality of legs, wherein the bottom wall has a thickness on the order of 0.60 to 2.5 mm.

14. The container of claim 13, wherein the bottom wall extends from about θ=60° to θ=90° from a vertical centerline of the container.

15. The container of claim 14, wherein each leg has an angled foot pad which is disposed at an angle of about 5 to 10° with a flat surface on which the container rests.

16. The container of claim 15, wherein the angled foot pads as formed are disposed at about 60 to 75% of the panel diameter.

17. The container of claim 13, wherein the container has an outwardly protruding and substantially rounded shoulder section above the panel section.

18. The container of claim 13, wherein the first thermoplastic material of virgin PET forms an exterior inner layer and an exterior outer layer and the second thermoplastic material is post-consumer PET and forms an interior core layer between the inner and outer layers.

19. The container of claim 18, wherein the second thermoplastic material comprises on the order of 30 to 60% of a total weight of the container.

20. The container of claim 19, wherein the first thermoplastic material comprises on the order of 40 to 70% of the total weight of the container.

21. The container of claim 1, having a relatively tall and slender profile, a shoulder portion and a panel portion with an average planar stretch ratio at least on the order of 13.0, and a footed base including a substantially hemispherical bottom wall wherein the bottom wall has a thickness greater than that of the panel portion.

22. The container of claim 21, wherein the bottom wall has a base profile of θ=60° to 90°, where θ is an angle that a radius, defining the substantially hemispherical bottom wall, extends from a vertical centerline of the container.

23. A multilayer injection molded preform for blow molding a container, the preform having a first injection molded layer of a first polyester material comprising virgin polyethylene terephthalate (PET) and having a first intrinsic viscosity (IV) of at least 0.85 dl/g, and a second injection molded layer adjacent the first layer of a second polyester material having a second intrinsic viscosity (IV) which is at least about 0.20 dl/g less than the first IV, the multilayer preform being injection molded without separation of the first and second layers.

24. The preform of claim 23, wherein the second IV differs by at least about 0.20 dl/g from the first IV.

25. The preform of claim 23, wherein the second thermoplastic is post-consumer PET (PC-PET).

26. The preform of claim 23, wherein the first IV is at least about 0.90 dl/g.

27. The preform of clam 26, the second IV is no greater than about 0.75 dl/g.

28. The preform of claim 27, wherein the first material forms an exterior inner layer and an exterior outer layer and the second material forms an interior layer.

29. The preform of claim 23, wherein the first material forms an exterior inner layer and an exterior outer layer and the second material forms an interior layer.

30. The preform of claim 23, further including:
a third layer adjacent one of the first and second layers, the third material having a third IV which differs by at least 0.10 dl/g from the IV of the material of the adjacent one of the first and second layers.

31. The preform of claim 30, wherein the first and second materials form at least a sidewall portion of the preform, and the third material is included in a base portion of the preform.

32. The preform of claim 23, wherein the first thermoplastic material of virgin PET forms an exterior inner layer and an exterior outer layer, and the second thermoplastic material is post-consumer PET and forms an interior core layer between the inner and outer layers.

33. The preform of claim 32, wherein the second thermoplastic material comprises on the order of 30 to 60% of a total weight of the preform.

34. The preform of claim 32, wherein the first thermoplastic material comprises on the order of 40 to 70% of the total weight of the preform.

* * * * *

UNITED STATES PATENT AND TRADEMARK OFFICE
CERTIFICATE OF CORRECTION

PATENT NO. : 6,548,133 B2
DATED : April 15, 2003
INVENTOR(S) : Schmidt et al.

It is certified that error appears in the above-identified patent and that said Letters Patent is hereby corrected as shown below:

<u>Column 13,</u>
Line 43, "feast" should read -- least --.

<u>Column 14,</u>
Line 3, "outer layer" should read -- outer layer, --
Line 38, "clam 26," should read -- claim 26, --

Signed and Sealed this

Twenty-sixth Day of August, 2003

JAMES E. ROGAN
*Director of the United States Patent and Trademark Office*